United States Patent [19]
Stewart et al.

[11] Patent Number: 5,903,458
[45] Date of Patent: May 11, 1999

[54] SYSTEM AND METHOD FOR FORMING GEOMETRIC FEATURES USING GLOBAL REPARAMETRIZATION

[75] Inventors: Paul Joseph Stewart; Yifan Chen, both of Ann Arbor, Mich.

[73] Assignee: Ford Global Technologies, Inc., Dearborn, Mich.

[21] Appl. No.: 08/869,321

[22] Filed: Jun. 6, 1997

[51] Int. Cl.$^6$ .............................. G06F 19/00; G06G 7/64; G06G 7/66

[52] U.S. Cl. ................................. 364/468.04; 364/468.03; 364/468.25; 364/474.05; 364/474.24; 395/118; 395/119

[58] Field of Search .......................... 364/474.24, 474.22, 364/468.01, 468.02, 468.03, 468.04, 474.26, 468.05, 468.09, 468.25, 474.05; 395/118, 119, 120; 382/154; 359/458

[56] References Cited

U.S. PATENT DOCUMENTS

| | | | |
|---|---|---|---|
| 5,119,309 | 6/1992 | Cavendish et al. | 364/474.24 |
| 5,175,601 | 12/1992 | Fitts | 356/376 |
| 5,345,546 | 9/1994 | Harada et al. | 395/142 |
| 5,471,569 | 11/1995 | Katoh | 395/134 |
| 5,513,310 | 4/1996 | Megard et al. | 395/161 |
| 5,517,607 | 5/1996 | Nishimura et al. | 395/160 |
| 5,619,625 | 4/1997 | Konno et al. | 395/119 |
| 5,627,949 | 5/1997 | Letcher, Jr. | 395/120 |
| 5,703,782 | 12/1997 | Dundorf | 364/474.29 |

*Primary Examiner*—William Grant
*Assistant Examiner*—Ramesh Patel
*Attorney, Agent, or Firm*—Joseph W. Malleck; Roger L. May

[57] ABSTRACT

An improved Direct Surface Manipulation (DSM) method is disclosed which incorporates a global surface reparametrization scheme for the purposes of extending the DSM method to applications involving multiple surfaces and for reducing the geometric effect of parametric space distortions on the features. This method reparametrizes multiple surface patches with a shared two-dimensional space defined in the object space of the model. The result is a geometrically consistent mesh, called a super-mesh, that serves as a global, uniform parametric space for topologically-disconnected, geometrically-disproportional surface patches. Spherical projection is employed to perform the patch reparametrization. This allows the creation of DSM features on multiple surface patches with improved shape quality.

19 Claims, 8 Drawing Sheets

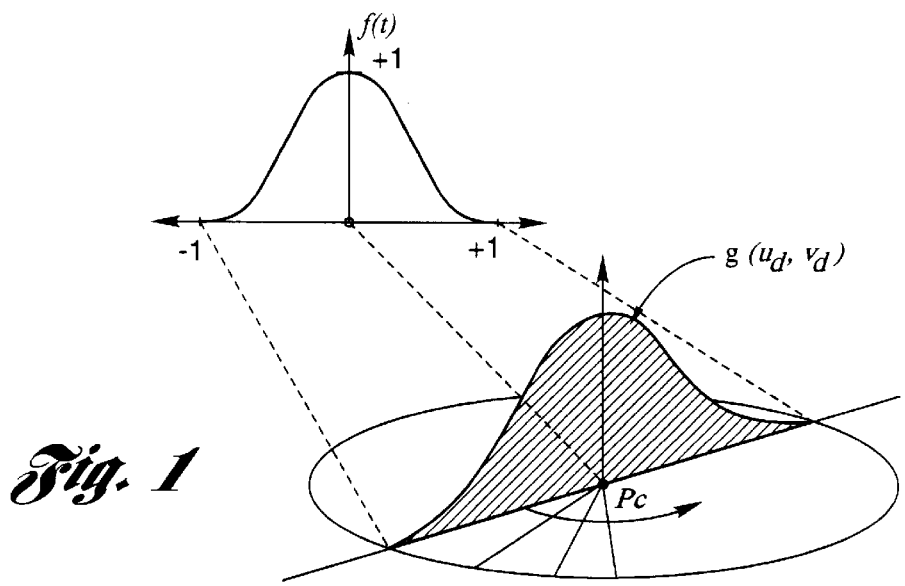
Fig. 1
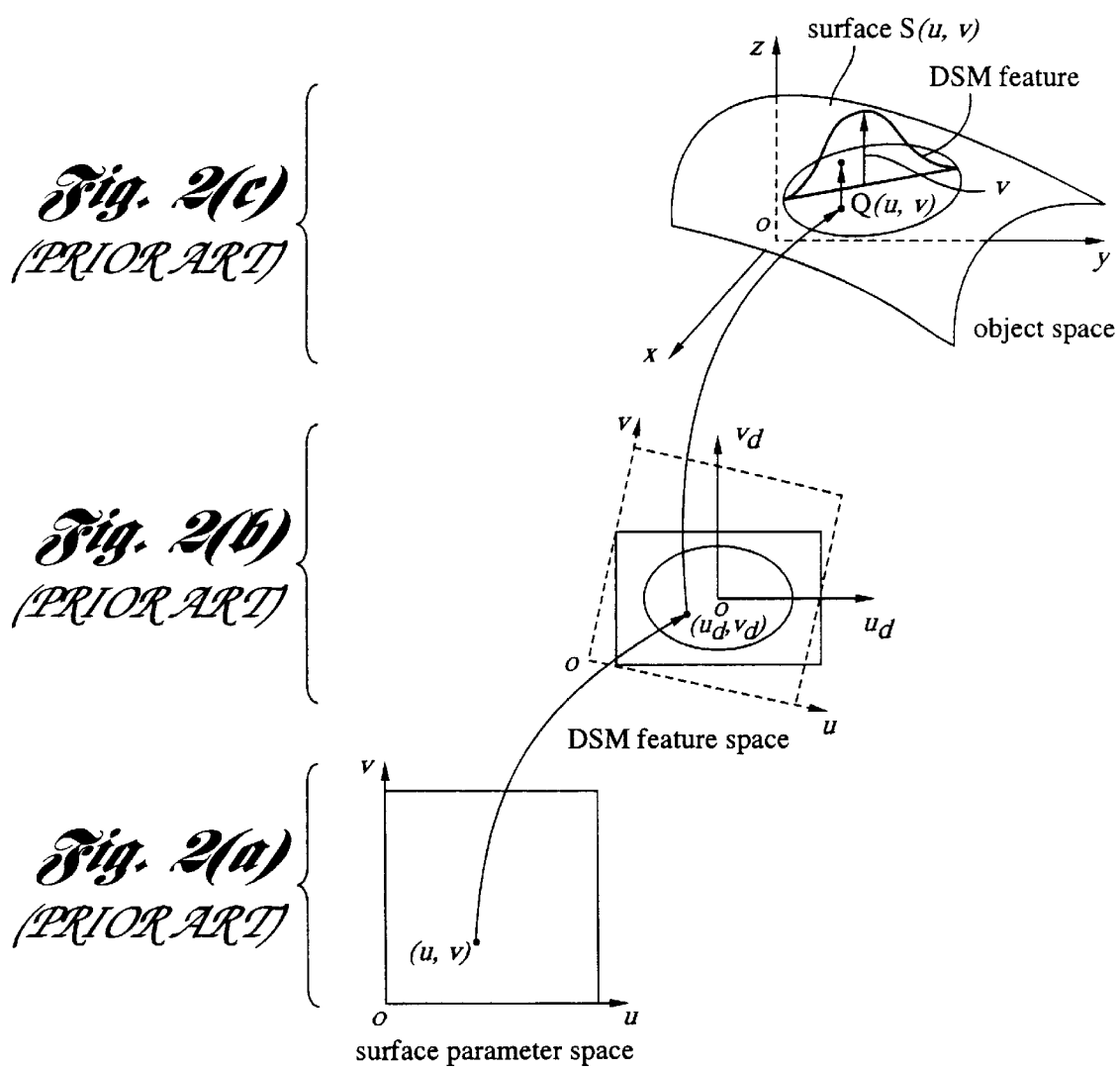
Fig. 2(c) (PRIOR ART)
Fig. 2(b) (PRIOR ART)
Fig. 2(a) (PRIOR ART)

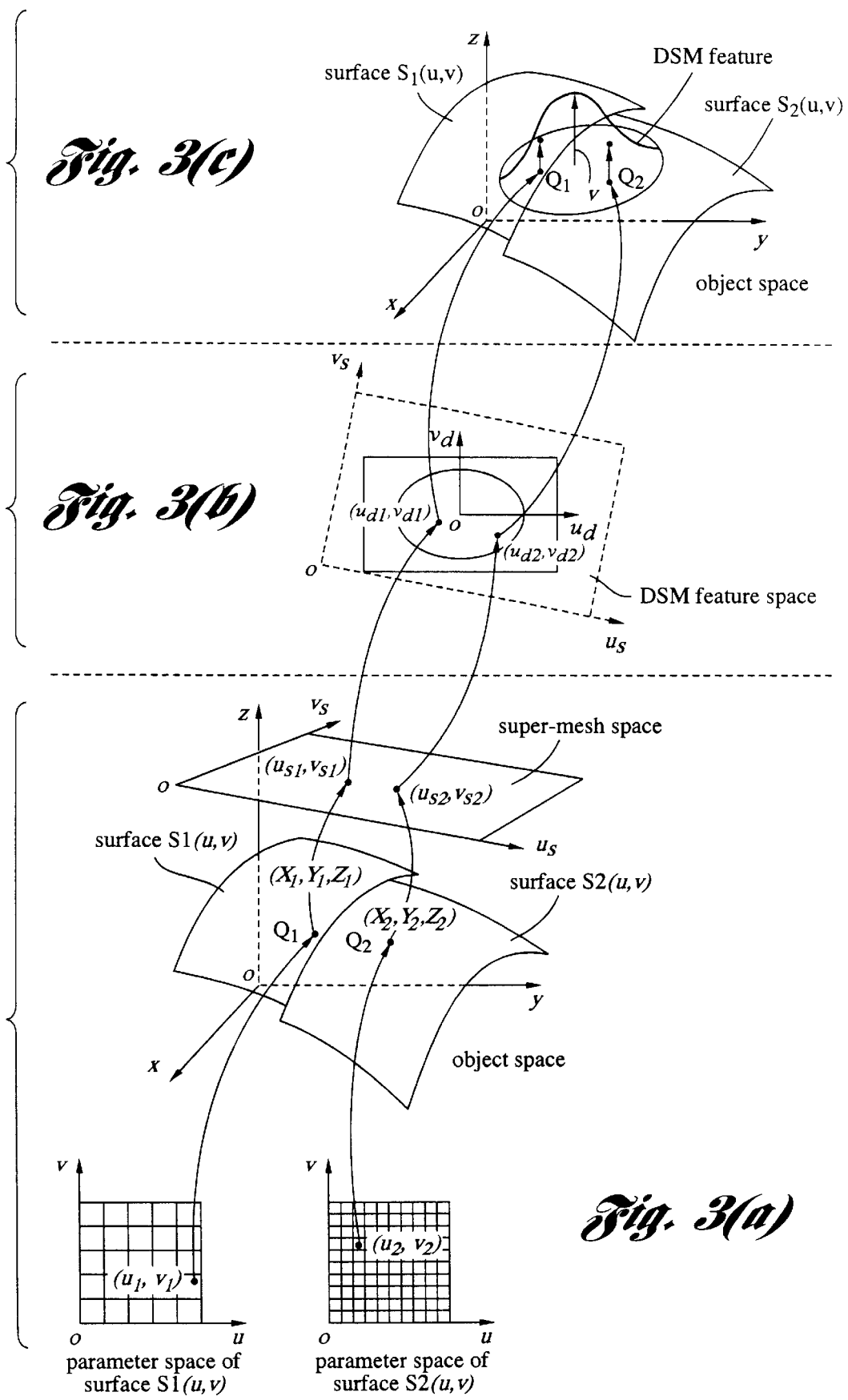

SYSTEM AND METHOD FOR FORMING GEOMETRIC FEATURES USING GLOBAL REPARAMETRIZATION

TECHNICAL FIELD

This invention relates to computer aided design (CAD) and manufacture (CAM) wherein direct shape control is provided over user-specified features on a parametric surface and more particularly to an improved method of Direct Surface Manipulation (DSM) that extends DSM to applications involving multiple surface patches while reducing the geometric effect of parametric space distortions on user-specified features.

BACKGROUND ART

Design of surface features is a frequent task in a wide variety of industrial CAD applications. In the automotive industry, in particular, surface feature design touches almost all major product development activities. Examples include design of head lamps for vehicle styling, structure reinforcement ribs for inner-panel engineering, spark-plug bosses of a cylinder chamber for engine prototyping, and draw-beads on stamping dies for manufacturing.

While the NURBS (Non-Uniform Rational B-Spline) paradigm allows a CAD user to create surface features by manipulating control points, in reality, however, using the control points as the degrees of freedom has two significant limitations. First, a control point is unable to isolate an arbitrary local or global region of influence and second, the basis function of a control point usually does not match the characteristics of the desired feature. Thus, without more sophisticated alternatives, it is difficult to form and maintain arbitrary user-specified features by employing the basic NURBS paradigm.

This has motivated research on a variety of related topics in an attempt to improve the relationship between the degrees of freedom and the features of the surface. A scheme has been developed for adding a smooth affect distribution to an arbitrary region of a propeller surface. See Interactive Adjustment of Surfaces, International Journal of Mechanical Sciences, 20(1), January 1978 and Simplified Method for the Interactive Adjustment of Surfaces, Computer-Aided Design, 12(6), November 1980 both by J. P. Duncan and G. W. Vicker. A similar technique has been developed for describing functional features such as automobile inner panels. Feature-Based Surface Design and Machining, IEEE CG&A, September 1992 by J. C. Cavendish and S. P. Marin and U.S. Pat. No. 5,119,309. Each is effective for the given application, but neither is well-suited to different surfaces in general.

A more general method was developed by one of the inventors of the present invention. Called Direct Surface Manipulation, or DSM, this method allows the specification of a local or global region of influence to be governed by a single control. See Direct Shape Control of Free-Form Curves and Surfaces with Generalized Basis Functions, Ph.D. Dissertation, by P. J. Stewart, University of Michigan, 1991 incorporated herein by reference.

Once a specific region has been isolated on a base parametric surface patch, selected features within the region can be manipulated by adjusting independent, meaningful parameters, each controlling a specific property of the feature, such as its location, boundary shape, height, and boundary continuities with the base surface. In addition, DSM features are based on and defined within the parametric space of the base surface patch. As a result, they are commutative, meaning that the resulting shape of the surface patch is independent of the order in which individual DSM features are applied. Such a property allows the rapid calculation of surface features, thus facilitating real-time model interaction.

Nevertheless, DSM has two major limitations. The first is its inability to describe features which span multiple surface patches. This is so because DSM features are defined within the parametric space of a single surface patch. In production applications, however, complex models are often described by a large number of surface patches and this limitation imposes a significant restriction on the use of DSM technology. The second limitation is that features described within the parametric space of a surface may be distorted when projected to the object space of a surface. This results from spatial inconsistencies between the two spaces. For instance, an equally spaced rectangular grid in parametric space may become a severely distorted mesh in object space. These distortions are inevitably reflected in the shape of the DSM features mapped onto the surface.

In this context a surface is defined as the geometric shape of at least a portion of a three dimensional CAD object. A surface patch is defined as a surface element with an independent reference frame. By parametric space of a surface, or surface UV domain, we mean the two dimensional parametric domain of a surface patch of parametric representation. A point in this space is given in (u,v) Cartesian coordinates. By object space we mean three dimensional modeling space where all surface patches resides. A point in object space is given in (x,y,z) Cartesian coordinates. By DSM feature space we mean two dimensional space where a DSM feature is defined (originated). A point in this space is given in $(u_d, v_d)$ Cartesian coordinates.

Referring to FIGS. 1 and 2, the prior art DSM method creates an entire geometric feature as a single mathematical entity through the use of basis functions. Basis functions govern the characteristics of the feature and mathematically guarantee the continuities between the feature and base surface patch. Conceptually, the creation of a feature can be summarized in the following steps.

1. Create a basis function in one dimension to represent the characteristic profile of a feature (f(t) in FIG. 1).
2. Translate the one dimensional basis function to a function in two dimensions in a DSM feature space that describes the characteristic shape of the feature ($g(u_d, v_d)$ in FIG. 1).
3. Map DSM feature space (i.e. with function $g(u_d, v_d)$) to the parametric space of the surface (FIGS. 2 (a) (b)).
4. Specify an offset vector that defines the location of an individual surface point lying within the boundary of the mapped basis function (V in FIG. 2(c)).
5. Offset the remainder of the points within the feature boundary parallel to the offset vector and scaled by the value of the basis function evaluated at the corresponding location (FIG. 2(c)).

The DSM method has also been extended to produce surface features with a fillet region. The so-called double bound DSM feature is formed by applying a basis function to bridge the two boundary curves of the feature, thus forming the fillet region. See for example, U.S. Ser. No. 08/550,151 now U.S. Pat. No. 5,731,816 filed Oct. 30, 1995, by the assignee of the present invention.

Applying the basis function requires the establishment of a one-to-one correspondence between the base surface patch and the feature. Current DSM obtains this relationship by mapping points either from the parametric space of the base surface patch into the DSM feature space or from the feature space into the parametric space, depending on how the surface patch or feature is tessellated. Without losing generality, it is assumed that a surface patch is tessellated based on its (u,v) grid regardless of the existence or shape of DSM features. Under this assumption, evaluation of a point Q always starts from its (u,v) location in the base surface patch's parametric space. Thus, if a DSM feature is involved, the necessary relationship between base surface patch and feature is obtained by mapping Q from the parametric space of the patch into the feature space. This process is illustrated in FIG. 2, where a parametric surface patch point location (u,v) is mapped into the DSM feature space and reparametrized as $(u_d, v_d)$. If the $(u_d, v_d)$ location is within the boundary of a DSM feature, the surface patch point must be modified during the formation of the feature and its final location in object space can be found as follows:

$$Q(u,v) = Q_b(u,v) + g(u_d(u,v), v_d(u,v))V \qquad (1)$$

where $Q_b$ represents the portion of Q obtained from the base surface, g is the two dimension basis function described previously, and V is the corresponding control vector of the DSM feature similar to the one shown in FIG. 2.

With the current DSM approach, which is also referred to as parametric DSM, the DSM feature space is directly superimposed on the parametric space of the base surface patch, as shown in FIG. 2. A major benefit of connecting the two spaces in this manner is that point mapping requires only standard coordinate transformations (rotation and translation), and is thereby computationally efficient. However, there are also negative consequences, the most important being that a DSM feature cannot be analytically defined over multiple surface patches and therefore must reside solely on a single patch. A second limitation is that a feature may not be faithfully formed in object space because there is often a spatial disproportion existing between the parametric space where the basis function is formed and object space that the feature is mapped into. For instance, a uniformly spaced grid in the parametric space may not have uniform spacing, or even be parallel, when mapped to object space. For this reason, the final shape of a feature will almost always exhibit some type of distortion.

SUMMARY OF THE INVENTION

In accordance with the present invention a method and apparatus is provided for solving both of the aforementioned problems associated with the prior art DSM method by introducing a uniform, global surface reparametrization scheme. With this scheme, multiple surface patches can be reparametrized in a single, shared two dimensional space that is spatially consistent with each of the patches. The resultant parametric space can be used as a foundation to form DSM features spanning multiple surface patches with substantially improved shape fidelity.

BRIEF DESCRIPTION OF THE DRAWINGS

A more complete understanding of the present invention may be had from the following detailed description which should be read in conjunction with the drawings in which:

FIG. 1 shows forming a two dimensional DSM basis function;

FIGS. 2(a)–2(c) shows reparametrization of a surface point in a DSM feature space;

FIGS. 3(a)–3(c) are an illustration of multiple surface patch reparametrization on a super-mesh space and the resulting formation process of a DSM feature;

DETAILED DESCRIPTION OF PREFERRED EMBODIMENT

Figure 4:
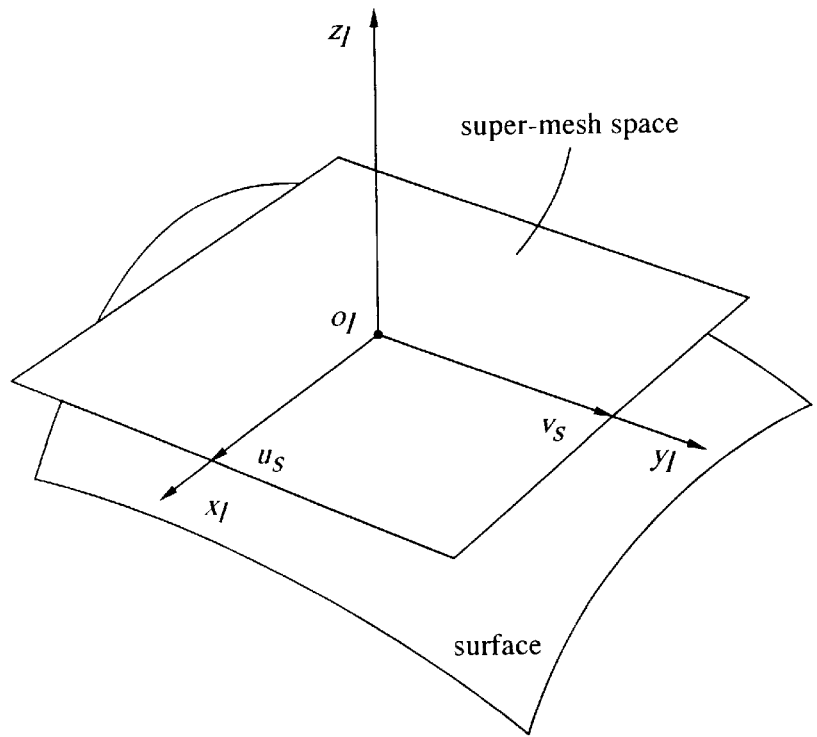
FIG. 4 shows the local Cartesian coordinate system defining a super-mesh space.

The present invention provides a surface reparametrization scheme that allows the formation of DSM features which span multiple surface patches and reduce shape distortion. This scheme addresses the limitations described above by providing a single workspace common to the different surface patches thus obtaining a consistent, uniform parametrization. To eliminate the distortion caused by the spatial difference between the object space and parametric space, the common workspace is chosen as a plane residing directly in the object space. Different surface patches can then be reparametrized on the plane using a proper, consistent mapping procedure, thereby resulting in a uniform mesh of these surfaces. The mesh is ultimately substituted into the DSM method for the surface parametric space where DSM features are mapped.

The shared workspace provides a common area to geometrically join topologically disconnected surfaces patches through a uniform surface reparametrization. We call this shared workspace the super-mesh space. A point in this space is given in $(u_s, v_s)$ Cartesian coordinates. Surface patch reparametrization in this space allows us to express surface patches of different UV domain in the same terms of $(u_s, v_s)$ coordinates. The related reparametrization process is called the super-mesh reparametrization, and the resulting multiple-surface mesh the super-mesh.

With this new scheme, a DSM feature is still defined in the DSM feature space as before. However, the feature space is now superimposed on the super-mesh space instead of the parametric space of a surface. To obtain the desired location, orientation, and size of the feature, the DSM feature space is mapped onto the super-mesh space with translation, rotation and scaling transformations.

Once a DSM feature and all surface patches involved are linked with a common, super-mesh space, the remaining steps of feature formation follow as before. A surface point Q in the super-mesh $(u_s,v_s)$ space is first transformed into the DSM feature space $(u_d,v_d)$. The basis function $g(u_d,v_d)$ is then evaluated for the point Q. The offset value of Q, or vector which defines its new location, is based upon this evaluation. There are several methods to calculate the offset. One is to multiply the control vector V by g, where the evaluation process of Q can be written as follows:

$$Q(u,v) = Q_b(u,v) + g(u_d(u_s,v_s), v_d(u_s,v_s))V \qquad (2)$$

Other methods of calculating an offset include, but are not limited to, 1) substituting a surface normal at Q for the direction of the offset, 2) calculating the offset magnitude as a blend, or weighted average, between to surfaces. The entire process is illustrated in FIG. 3.

Since a super-mesh space exists in object space, point Q can be reparametrized using an appropriate geometric projection method. In FIG. 3, for instance, this would mean projecting Q into the super-mesh space to obtain its $(u_s,v_s)$ coordinates. Since the projection procedure can be strictly geometric and, thus, does not rely on any surface parametric space, the new reparametrization scheme does not even require that the surfaces under reparametrization be parametric. In fact they can be algebraic or even discrete (such as point clouds). For this reason, a DSM feature resulting from the super-mesh reparametrization is called a geometric DSM. Conceptually, the steps of forming super-mesh DSM features can be summarized in the following steps.

1. For all selected, independent surface patches, define a super-mesh space, (FIG. 3(a)).
2. Map all the selected surface patches from the object space to the super-mesh space, thereby reparametrizing them in the same terms of $(u_s,v_s)$ such as $(u_{s1},v_{s1})$, and $(u_{s2},v_{s2})$ for points $Q_1$ and $Q_2$ from two different parametric surface patches shown in FIG. 3(a).
3. Create a basis function in one dimension to represent the characteristic profile of a feature (f(t) in FIG. 1).
4. Translate the one dimensional basis function to a function in two dimensions in a DSM feature space that describes the characteristic shape of the feature $(g(u_d, v_d)$ (FIG. 1).
5. Map DSM feature space $(g(u_d,v_d)$ to the super-mesh space (FIG. 3(b)).
6. Specify an offset vector that defines the location of an individual surface point lying within the boundary of the mapped basis function (V in FIG. 3(c)).
7. Offset the remainder of the points within the feature boundary parallel to the offset vector and scaled by the value of the basis function evaluated at the corresponding location (FIG. 3(c)).

As discussed above, super-mesh reparametrization can be obtained by projecting surface points into the super-mesh space. Different projection-based methods are available to map two-dimensional geometric shapes onto three-dimensional CAD models. Spherical projection was determined to be most preferable for controlling image distortions in regions containing substantial curvature variation and it's relative insensitivity to projection orientation. However, a super-mesh can be created with other projection methods. We call the resulting super-mesh a spherical super-mesh and the super-mesh reparametrization the spherical super-mesh reparametrization.

Before further discussion of the spherical super-mesh, a local Cartesian coordinate system ($R^3$) needed to define a super-mesh space will be introduced. FIG. 4 shows such a system for which the origin $o_1$ is located at a given point on one of the surface patches to be reparametrized. The $z_1$ axis of the system is chosen as normal to the super-mesh space ($R^2$). Additionally, two orthogonal axes $x_1$ and $y_1$ are defined to complete the description of the system. The two axes also span the super-mesh space. Although the two dimensional super-mesh coordinate system can be established independently of the two axes, it is convenient to line up $u_s$ and $v_s$ with $x_1$ and $y_1$, respectively. With the definition of the local and super-mesh Cartesian coordinate systems, the objective of the super-mesh reparametrization can be described as finding the $(u_s,v_s)$ coordinates of all (x,y,z) surface points projected onto the super-mesh space.

Figure 5:
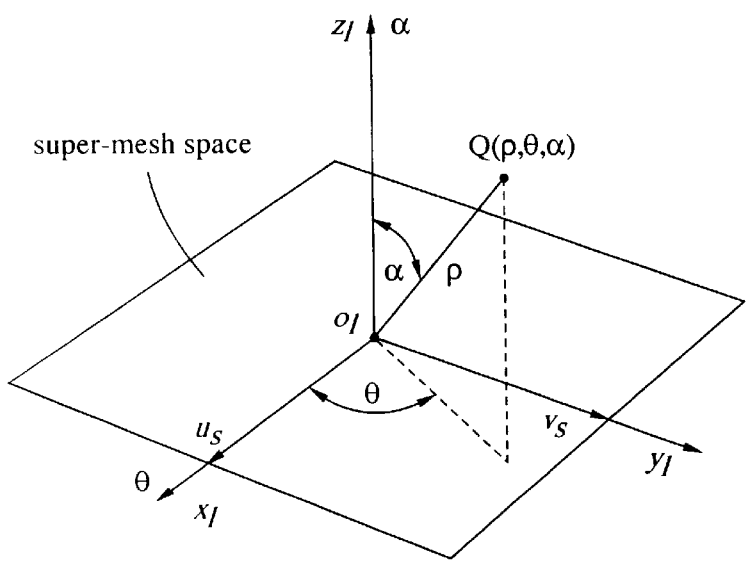
FIG. 5 shows the local spherical coordinate system.

The spherical projection will now be considered. For a spherical projection, a point Q is projected along the path of a semi-circle centered about the origin $o_1$ of the local coordinate system. For ease of mathematical development, Q can be represented in spherical coordinates $(\rho,\theta,\alpha)$. When converting coordinates from a Cartesian to a spherical system, our convention is that the $\theta$ axis is always aligned to the $x_1$ axis and the $\alpha$ axis to the $z_1$ axis. As such, the ranges of spherical coordinates are as follows: $\rho>0$, $0<=\theta<=2\pi$, and $0<=\alpha<=\pi$. FIG. 5 provides an illustration of this convention. Note that under this convention, the super-mesh space is given by $\alpha=\pi/2$.

There are two opposing mapping scenarios. In the first, (x,y,z) surface points in object space are mapped into the super-mesh space, the result of which are corresponding super-mesh $(u_s,v_s)$ coordinates used for uniform surface reparametrization. We call this procedure Forward Mapping. The second scenario involves mapping specific points from a DSM feature in the opposite direction, i.e., from super-mesh space onto the surface patches involved. This is called Backward Mapping. The mathematics of the two mappings are detailed below.

Forward Mapping

Figure 6:
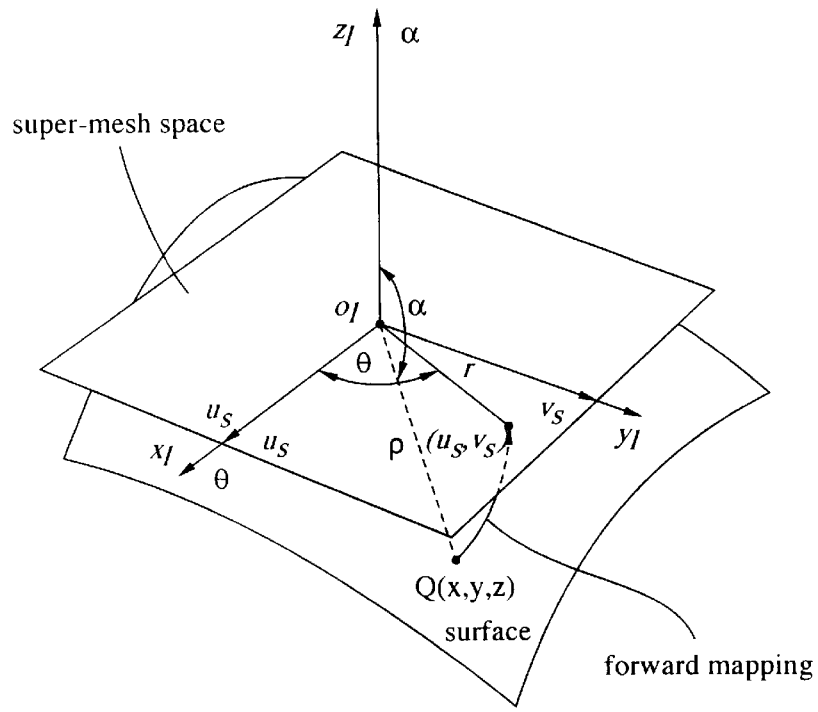
FIG. 6 is an illustration of forward mapping through spherical projection.

Forward mapping is a $R^3 \rightarrow R^2$ process in which the objective is to find the $(u_s,v_s)$ coordinates of a surface point Q(x,y,z). FIG. 6 shows a graphical depiction of this process. Mapping Q(x,y,z) from the global Cartesian (x,y,z) space into the super-mesh $(u_s,v_s)$ space involves three steps of calculation as follows:

1. Transform (x,y,z) into spherical coordinates $(\rho,\theta,\alpha)$.
2. Spherically project Q into the super-mesh space, i.e., transform $(\rho,\theta,\alpha)$ into super-mesh polar coordinates $(r,\theta)$.
3. Convert $(r,\theta)$ into Cartesian coordinates $(u_s,v_s)$.

In Step 1, Q is first transformed into the local $(x_1,y_1,z_1)$ Cartesian system. This involves standard coordinate transformations including translations and rotations. It is well known that by using homogenous coordinates, different transformations can be consistently modeled by 4×4 matrices. Furthermore, the net effect of applying different transformations is obtained simply by multiplying the individual matrix transformations.

Let $[M]_{4\times 4}$ denote the concatenated transformation matrix that converts a point from its global Cartesian coordinates into local Cartesian coordinates. With this matrix, transforming Q(x,y,z) into its local coordinates $(x_1,y_1,z_1)$ can be done as follows:

$$[x_1,y_1,z_1,w]^T = [x,y,z,1][M]_{4\times 4} \qquad (3)$$

where $[M]_{4\times 4}$ is the transformation matrix. Equation 3 can be expanded into $$x_1=(x\,m_{11}+y\,m_{21}+z\,m_{31}+m_{41})/W$$

$$y_1=(x\,m_{12}+y\,m_{22}+z\,m_{32}+m_{42})/W$$

$$z_1=(x\,m_{13}+y\,m_{23}+z\,m_{33}+m_{43})/W \quad (4)$$

where $\{m_{ij}\}$ are the elements of $[M]_{4\times4}$ and, further, $$W=x\,m_{41}+y\,m_{42}+z\,m_{43}+m_{44}$$

With $(x_1,y_1,z_1)$, Q can be converted into spherical coordinates as follows:

$$\rho = \sqrt{x_l^2 + y_l^2 + z_l^2} \quad (5)$$

$$\theta = \arctan\left(\frac{y_l}{x_l}\right)$$

$$\alpha = \arccos\left(\frac{z_l}{\rho}\right)$$

In Step 2, Q is spherically projected into the super-mesh space, i.e., $(\rho,\theta,\alpha)$ is transformed into $(r,\theta)$. Since the projection path is orthogonal to one of the three spherical coordinate directions and since the $u_s$ and $v_s$ axes are lined up with $x_1$ and $y_1$ axes of the local coordinate system, the transform is obtained simply by omitting the $\alpha$ coordinate. Specifically: $r=\rho$ and $\theta=\theta$. Although calculation of $\alpha$ is not required, the formula is provided in Equation (5) for completeness. With $(r,\theta)$ found, the Cartesian coordinates of Q in the super-mesh space are computed in Step 3 as follows:

$$\begin{cases} u_s = r\cos\theta \\ v_s = r\sin\theta \end{cases} \quad (6)$$

Note that $r=0$ is a singular case, in which both $u_s$ and $v_s$ are set to zero.

Backward Mapping

Figure 7:
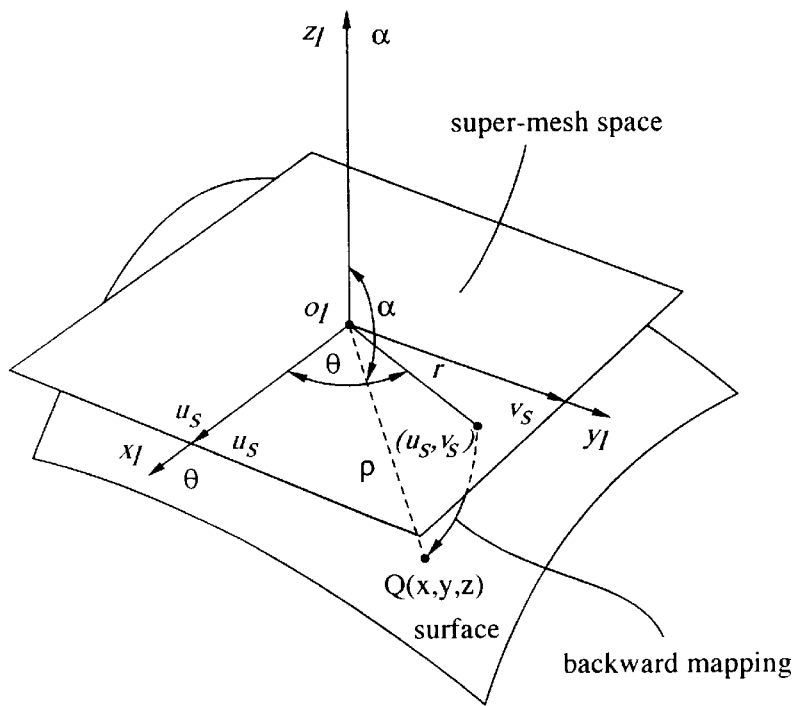
FIG. 7 is an illustration of backward mapping through spherical projection.

Backward mapping projects points from the super-mesh space onto the affected surface patches, which is a $R^2 \to R^3$ mapping. FIG. 7 illustrates this process. Backward mapping is applied in the context of DSM in order to calculate the location of feature boundary curves on affected surface patches. Assume that any surface patch involved is of parametric representation and, on a conceptual level, can be written as vector function $Q(u,v)$, or in its component form $(x_Q(u,v), y_Q(u,v), z_Q(u,v))^T$, in the global object space. Thus, starting from the $(u_s,v_s)$ coordinates of a point Q in the super-mesh space, backward mapping requires the solving of the $(u,v)$ values of its projection on the corresponding parametric surface patch. Let C denote a point defined in the super-mesh space with coordinates $(u_s,v_s)$. Mapping C onto a surface involves the same three steps but in the opposite order:

1. Convert $(u_s,v_s)$ into polar coordinates $(r,\theta)$.
2. Transform $(r,\theta)$ into spherical coordinates $(\rho,\theta,\alpha)$.
3. Spherically project C onto the surface, i.e., transform $(\rho,\theta,\alpha)$ into $(u,v)$, which, in term, gives $(x,y,z)$.

Converting $(u_s,v_s)$ into polar coordinates $(r,\theta)$ in Step 1 Can be done as follows:

$$r = \sqrt{u_s^2 + v_s^2} \quad (7)$$

$$\theta = \arctan\left(\frac{v_s}{u_s}\right)$$

Again due to the alignment of the $u_s$ and $v_s$ axes with the $x_1$ and $y_1$ axes of the local coordinate system, transforming $(r,\theta)$ into spherical coordinates $(\rho,\theta,\alpha)$ in Step 2 is accomplished by equating $\rho$ to r and by taking $\theta$ directly from the corresponding polar coordinate. Note that $\alpha$ represents the added dimension as a result of the projection; by adding $\alpha$ in Step 3, C is first transformed into a semi-circle in the local coordinate system as follows:

$$x_1(\alpha)=\rho\cos\theta\sin\alpha$$

$$y_1(\alpha)=\rho\sin\theta\sin\alpha$$

$$z_1(\alpha)=\rho\cos\alpha \quad (8)$$

where $o \leq \alpha \leq \pi$. Next, the semi-circle is transformed into the global object space by multiplying a transformation matrix which is the inverse of the matrix $[M]_{4\times4}$ as previously discussed in forward mapping. Let $[N]_{4\times4}=[M]^{-1}_{4\times4}$ be the inverse matrix, the semi-circle can be transformed into the global coordinates as follows:

$$[x(\alpha),y(\alpha),z(\alpha),w]^T=(x_1(\alpha),y_1(\alpha),z_1(\alpha),1)[N]_{4\times4} \quad (9)$$

which can be expanded into $$x(\alpha)=(x_1(\alpha)n_{11}+y_1(\alpha)n_{21}+z_1(\alpha)n_{31}+n_{41})/W(\alpha)$$

$$y(\alpha)=(x_1(\alpha)n_{12}+y_1(\alpha)n_{22}+z_1(\alpha)n_{32}+n_{42})/W(\alpha)$$

$$z(\alpha)=(x_1(\alpha)n_{13}+y_1(\alpha)n_{23}+z_1(\alpha)n_{33}+n_{43})/W(\alpha) \quad (10)$$

where $\{n_{ij}\}$ are the elements of $[N]_{4\times4}$ and, further, where $\{m_{ij}\}$ are the elements of $[M]_{4\times4}$ and, further, $$W(\alpha)=x_1(\alpha)n_{41}+y_1(\alpha)n_{42}+z_1(\alpha)n_{43}+n_{44}$$

Note that projection of C on a surface is in fact the intersection between the semi-circle and the surface $(x_Q(u,v), y_Q(u,v), z_Q(u,v))^T$, i.e., the solution of the following system of equations:

$$x(\alpha)-x_Q(u,v)=0$$

$$y(\alpha)-y_Q(u,v)=0$$

$$z(\alpha)-z_Q(u,v)=0 \quad (11)$$

which can be written in a more general form $$\Delta x(\alpha,u,v)=0$$

$$\Delta y(\alpha,u,v)=0$$

$$\Delta z(\alpha,u,v)=0 \quad (12)$$

Therefore, to completely determine the projected point we need to solve for $(\alpha,u,v)^T$. Equation (12) form a nonlinear system and can be solved numerically using a Newton type of method. From a given starting point $(\alpha,u,v)_o^T$, the system iteratively finds the next point using the following estimation formula:

$$\begin{bmatrix} \alpha \\ U \\ V \end{bmatrix}_{i+1} = \begin{bmatrix} \alpha \\ u \\ v \end{bmatrix}_i - ([J])_i^{-1} \begin{bmatrix} \Delta\alpha \\ \Delta u \\ \Delta v \end{bmatrix}_i \quad (13)$$

where:

$$[J] = \begin{bmatrix} \frac{\partial}{\partial \alpha}\Delta x & \frac{\partial}{\partial u}\Delta x & \frac{\partial}{\partial V}\Delta x \\ \frac{\partial}{\partial \alpha}\Delta y & \frac{\partial}{\partial u}\Delta y & \frac{\partial}{\partial V}\Delta y \\ \frac{\partial}{\partial \alpha}\Delta z & \frac{\partial}{\partial u}\Delta z & \frac{\partial}{\partial v}\Delta z \end{bmatrix} \quad (14)$$

is the Jacobian matrix of system, Equation (12). The iteration process continues until the magnitude of the error is small enough, i.e., when $$|\Delta\alpha, \Delta u, \Delta v| < \epsilon$$

where $\epsilon$ is the pre-defined tolerance.

Boundary Intersection

Figure 8:
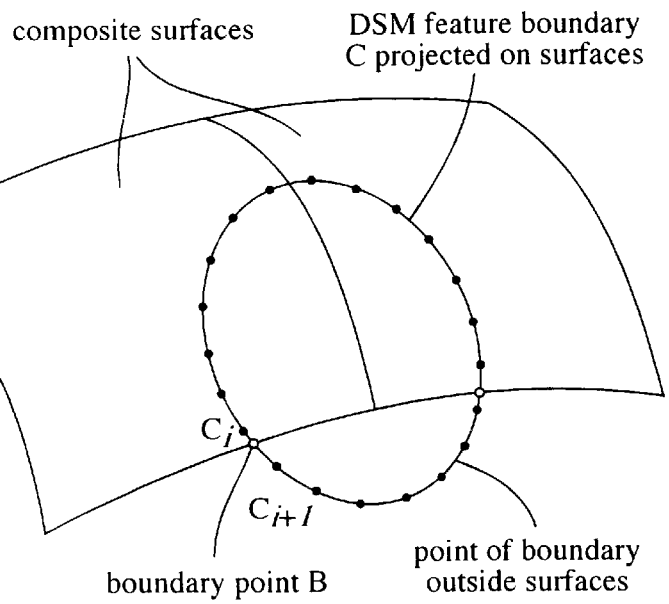
FIG. 8 is an illustration of a boundary intersection scenario.

The method of backward mapping as described above works for points that are able to be projected within the boundaries of the surface patches under consideration. However, for proper rendering of DSM features that are not contained fully on a set of surface patches, it is important to find the exact point that a DSM feature boundary intersects the surface patch boundary. An example of such a case is shown in FIG. 8.

Without loss of generality, we can assume that a DSM boundary curve is represented by an ordered sequence of points with sufficient point resolution. Thus a boundary crossing can be identified by checking the validity of the returned (u,v) values of two consecutive points in a sequence. If both pairs of (u,v) values are within the valid parameter range of the surfaces or neither of the pairs are within the valid range, then one can conclude that no boundary crossing has occurred between the two points. Otherwise, a boundary crossing must have occurred, in which case the points are considered the candidate pair.

Figure 9:
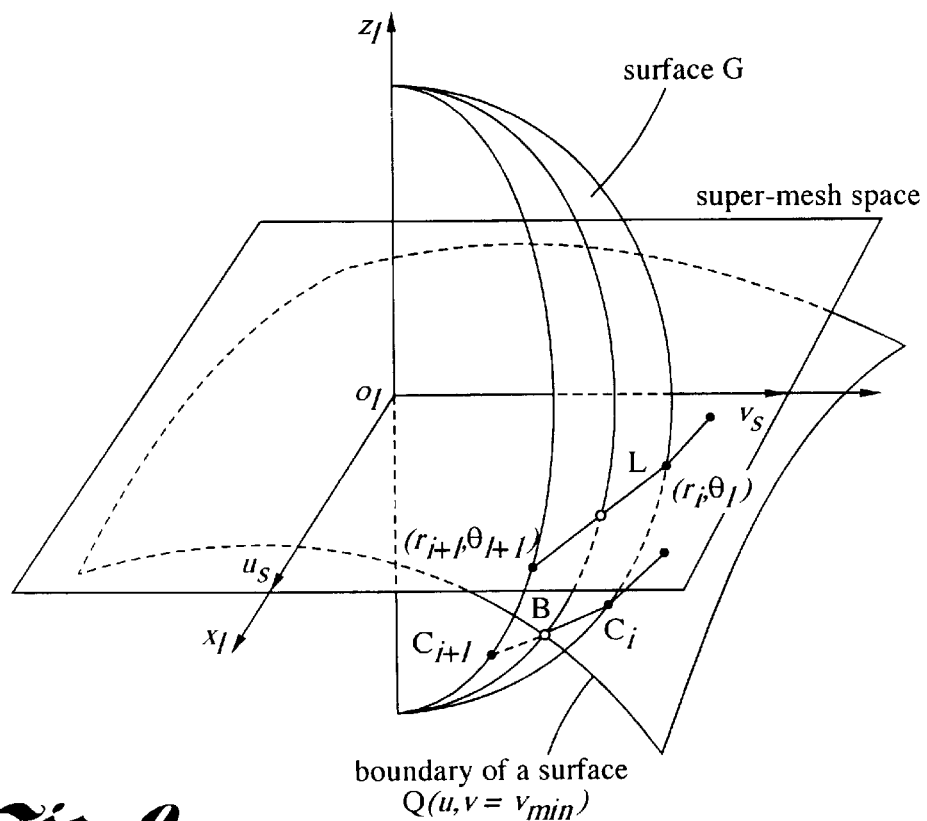
FIG. 9 show a geometric interpretation of the boundary intersection problem.

The geometric interpretation of the boundary intersection problem involving the candidate pair is given as follows. The set of the projection paths (semi-circles) formed by linearly interpolating the two semi-circles of the candidate pair, in fact, represents a surface in the object space, as denoted by G in FIG. 9. On the other hand, the boundary of the surface patch involved in the intersection problem is a parametric curve, such as the one labeled by $Q(u,v=v_{min})$ in FIG. 9. The intersection of G and the parametric curve is, therefore, the point where the projected DSM boundary curve crosses the edge of the surface.

The mathematical representation of surface G can be derived by first finding the equation of the line segment L in the super-mesh space that connects two points corresponding to the candidate points $C_i$ and $C_{i+1}$. In polar coordinates, L can be found as follows:

$$L(s) = \begin{cases} r(s) = r_i + s(r_{i+1} - r_i) \\ \theta(s) = \theta_i + s(\theta_{i+1} - \theta_i) \end{cases} \text{ for } 0 \leq s \leq 1 \quad (16)$$

where $r_i$, $r_{i+1}$, $\theta_i$, and $\theta_{i+1}$ can be determined with (7); and s is the parameter of the line. Next, surface G can be defined in the local spherical coordinates by sweeping a semi-circle passing through all points from $C_i$ to $C_{i+1}$ along $L(s)$, by which we obtain:

$$G(s, \alpha) = \begin{cases} x_l(s, \alpha) = \rho(s)\cos\theta(s)\sin\alpha \\ y_l(s, \alpha) = \rho(s)\sin\theta(s)\sin\alpha \\ z_l(s, \alpha) = \rho(s)\cos\alpha \end{cases} \quad (17)$$

where $\rho(s)=r(s)$. Next $G(s,\alpha)$ is transformed into the global x,y,z coordinate system by multiplying a transformation matrix $[N]_{4\times 4}$, i.e., the inverse of $[M]_{4\times 4}$, as follows:

$$[x(s,\alpha), y(s,\alpha), z(s,\alpha), w]^T = [x_1(s,\alpha), y_1(s,\alpha), z_1(s,\alpha), 1][N]_{4\times 4} \quad (18)$$

which can be expanded into $$x(s,\alpha) = (x_1(s,\alpha)n_{11} + y_1(s,\alpha)n_{21} + z_1(s,\alpha)n_{31} + n_{41})/W(s,\alpha)$$

$$y(s,\alpha) = (x_1(s,\alpha)n_{12} + y_1(s,\alpha)n_{22} + z_1(s,\alpha)n_{32} + n_{42})/W(s,\alpha)$$

$$z(s,\alpha) = (x_1(s,\alpha)n_{13} + y_1(s,\alpha)n_{23} + z_1(s,\alpha)n_{33} + n_{43})/W(s,\alpha) \quad (19)$$

where $\{n_{ij}\}$ are the elements of $[N]_{4\times 4}$ and, further, $$W(s,\alpha) = x_1(s,\alpha)n_{41} + y_1(s,\alpha)n_{42} + z_1(s,\alpha)n_{43} + n_{44} \quad (20)$$

When the surface patch boundary involved is a topological boundary, it is one of the four iso-parameter lines: $Q(u=u_{min},v)$, $Q(u=u_{max},v)$, $Q(u,v=v_{min})$, $Q(u,v=u_{max})$. Consider a v=constant boundary, i.e., Q(u). Since the intersection point is on both $G(s,\alpha)$ and Q(u), it must satisfy the following system of equations:

$$x(s,\alpha) - x_Q(u) = 0$$

$$y(s,\alpha) - y_Q(u) = 0$$

$$z(s,\alpha) - z_Q(u) = 0 \quad (21)$$

which can also be written in a more general form $$\Delta x(s,\alpha,u) = 0$$

$$\Delta y(s,\alpha u) = 0$$

$$\Delta z(s,\alpha,u) = 0 \quad (22)$$

for which the solution vector is $(s,\alpha,u)^T$. Note that (22) is also a nonlinear system and can be solved by the same numerical procedure used to solve the Equation (12) backward mapping problem. Note that for an u=constant boundary, i.e., Q(v), we only need to substitute v for u in (21) and (22). On the other hand, if the surface patch is trimmed by a domain curve Q(u(t),v(t)), the formulation also applies directly by substituting t for u in (21) and (22).

Defining the Super-Mesh Coordinate System

Figure 10:
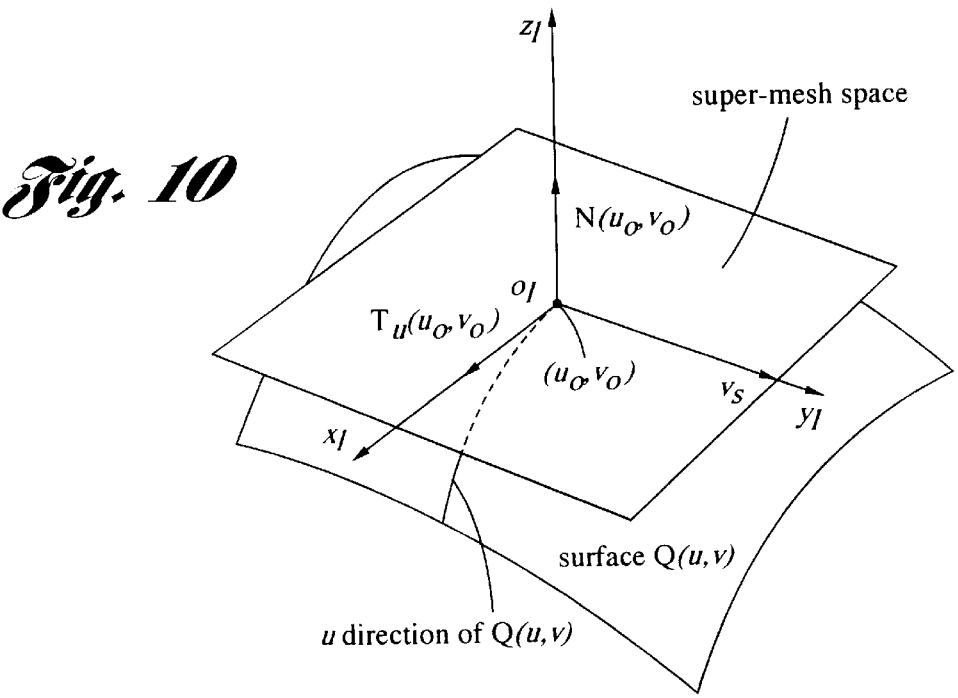
FIG. 10 shows a coordinate convention for the super-mesh space.

The coordinate convention for the super-mesh space is illustrated in FIG. 10. For super-mesh reparametrization, the local Cartesian coordinate system has to be established first. Although the rule to establish the system is not unique, the following can be considered as a common convention: First, the origin $o_1$ is always located at a point on the surface(s), as specified by the user. Subsequently, the surface normal N and two tangent vectors $T_u$ and $T_v$ at $o_1$ can be evaluated. The surface normal vector N is used as the normal vector to the super-mesh space and, thus, orients the $z_1$ axis of the local coordinate system. Similarly, $T_u$ is used to orient the $x_1$ axis. Finally, the $y_1$ axis can be determined by using the right-hand rule.

Note that it is mandatory that $o_1$ be in contact with the surface patches of application. Otherwise, the super-mesh space will have a circular region, centered at $o_1$, within which no points can be projected onto the surface(s). The size, or radius, of the region is determined by the minimum distance between $o_1$ and the surface(s). The lack of this one-to-one mapping would create computational problems for surface reparametrization in the super-mesh space (forward mapping) as well as for projection of DSM boundary curves onto the surface patches (backward mapping).

Surface Evaluation

Figure 11:
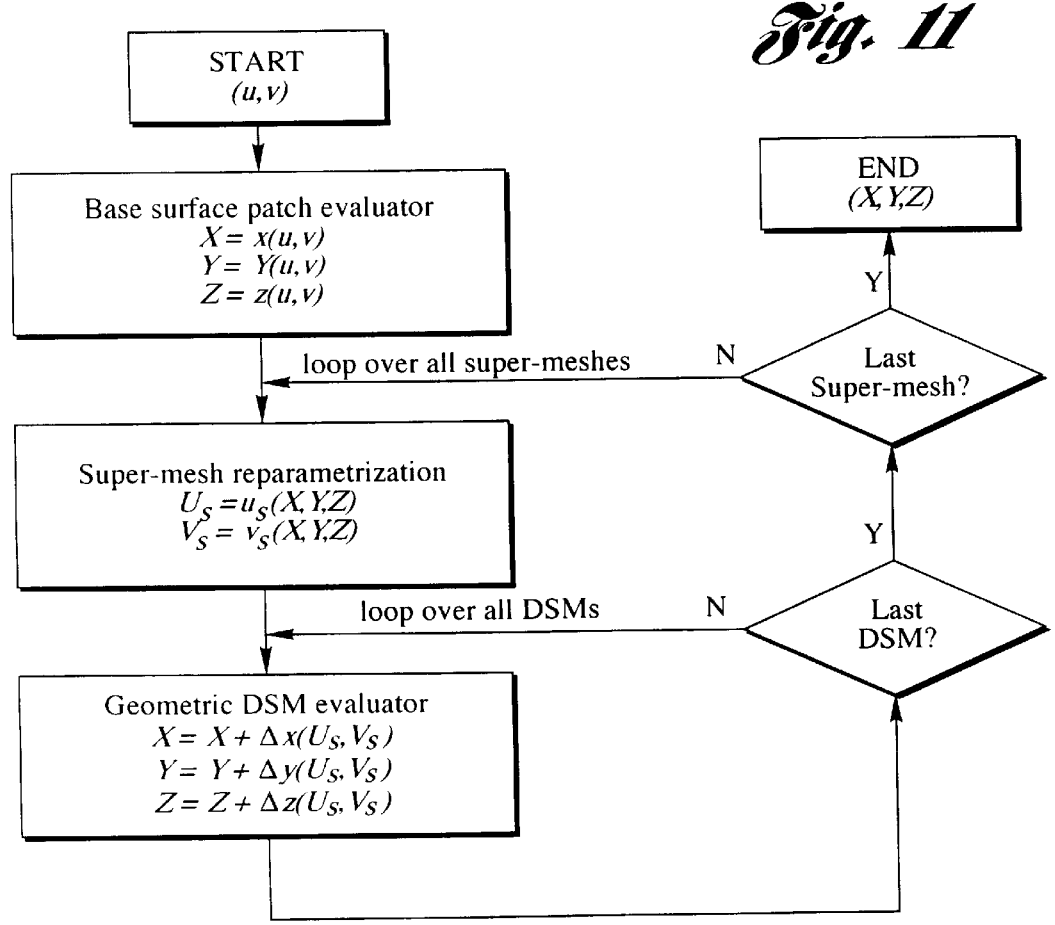
FIG. 11 is a flowchart illustrating a method of implementing the present invention.

Following the surface tessellation assumption made hereinbefore, evaluation of a surface patch point $Q(u,v)$ involving geometric DSM features can be implemented according to the flowchart shown in FIG. 11. Starting from the (u,v) parameters of the point, the coordinates are first processed by the surface patch evaluator. The result is the (x,y,z) location of Q on the base surface. Next, Q is reparametrized on each affecting super-mesh. For each resulting $(u_s,v_s)$ parameter pair, an inner loop is run to update Q using the evaluators of all resident geometric DSM features. The process continues until all related super-meshes and geometric features are accounted for.

Note that one of the important properties of parametric DSM is order independence, meaning that, when multiple features co-exist and overlap each other, the order of their creation will not affect the final result. This is because the parametrization of a surface patch point remains the same regardless of its geometric location in the object space.

For geometric DSM, this property may still exist depending on the implementation of the super-mesh reparametrization. For instance, one can implement in a way that the $(u_s,v_s)$ parameters under a particular super-mesh are always calculated excluding all its resident features as well as those residing in the succeeding super-meshes, as shown in FIG. 11. As a result, swapping the order of evaluating two features defined in the same super-mesh space will not affect the outcome. However, changing the order of two individual super-meshes will clearly affect the final result. Although total order independence can be obtained by reparametrizing Q based solely on its location from the base patch, the method would become less effective in existence of complex, multiple features.

In general, any modification made to the base surface patch will mandate the reparametrization of all geometric features on the surface patch, regardless of the super-mesh space in which they reside. This is disadvantageous from computation point of view because all features have to be rebuilt from scratch.

Figure 12:
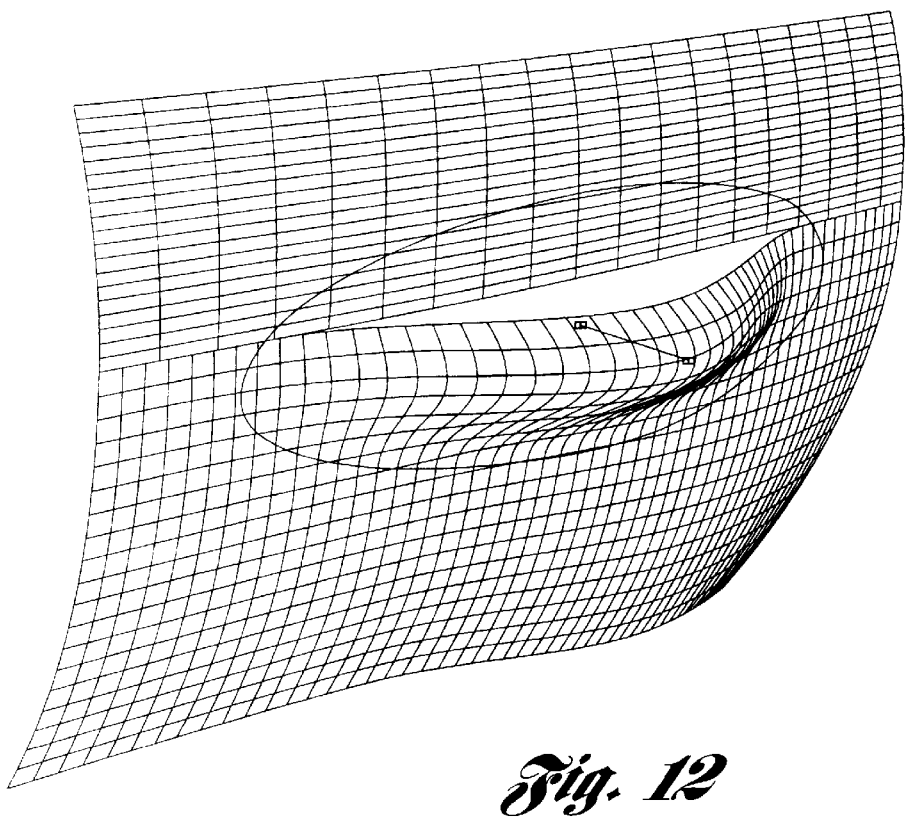
FIG. 12 shows that the parametric DSM feature created on the lower surface does not cross the patch boundary onto the upper surface, causing a gap to form in the model.
Figure 13:
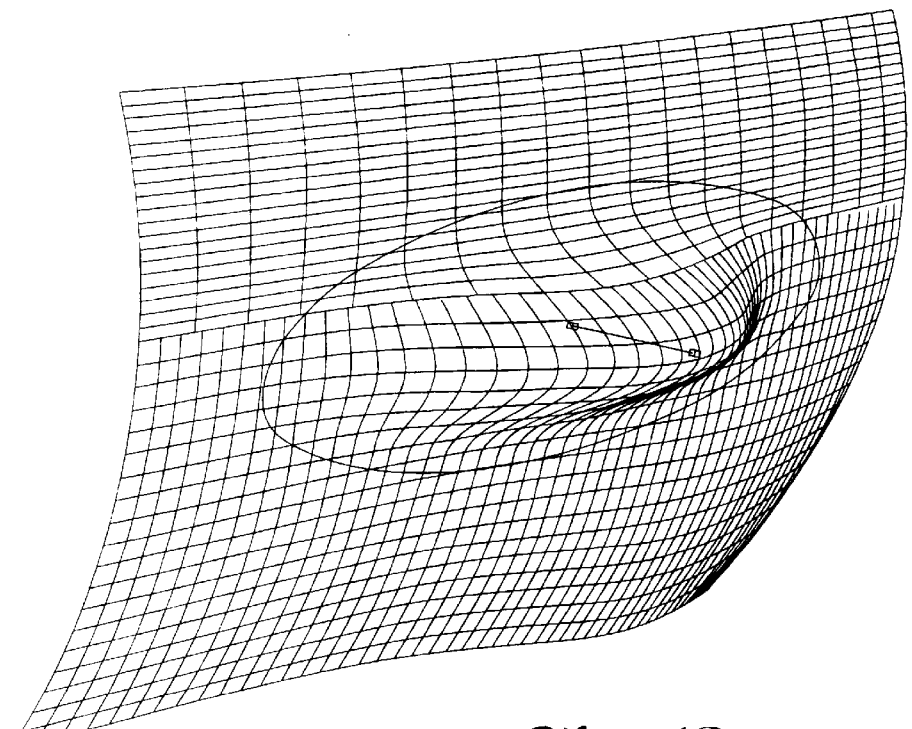
FIG. 13 shows a geometric DSM feature placed on the same surface patches as shown in FIG. 12.

As previously mentioned the most important negative consequences of the prior art DSM approach depicted in FIG. 2 is that a DSM feature cannot be analytically defined over multiple surface spaces and therefore must reside solely on a single base surface. This is illustrated in FIG. 12 where the parametric DSM feature created on the lower surface patch does not cross the patch boundary onto the upper surface patch, causing a gap to form in the model. FIG. 13 illustrates the cross-boundary capability of geometric DSM features using the same patches used to illustrate the limitations of the parametric DSM in FIG. 12. A super-mesh was created near the common boundary of the two patches and both surfaces were reparametrized. A geometric feature was created in the common parameter space and placed on both surfaces. The use of the unified, uniform super-mesh reparametrization, results in the cross-patch-boundary continuity within the feature being the same as the original continuity between the two patches.

Figure 14:
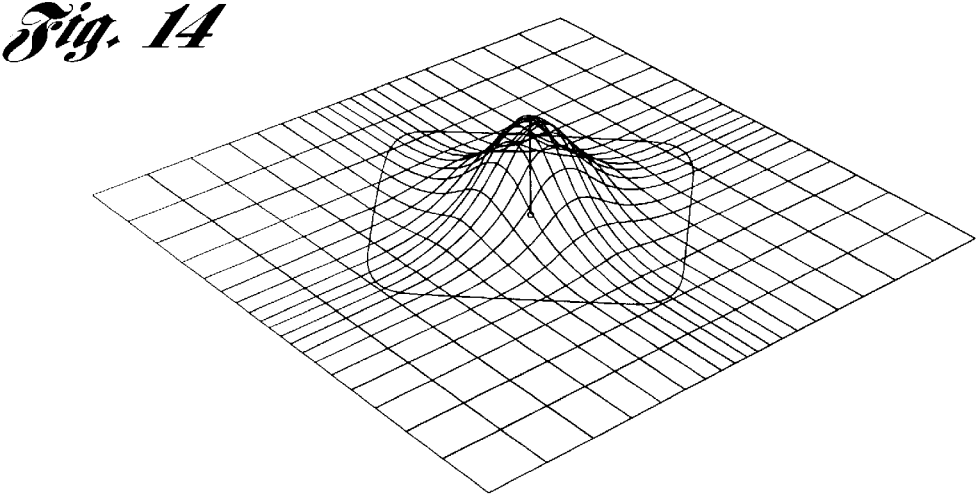
FIG. 14 shows a parametric DSM feature placed on a surface which does not have uniform parametric spacing.
Figure 15:
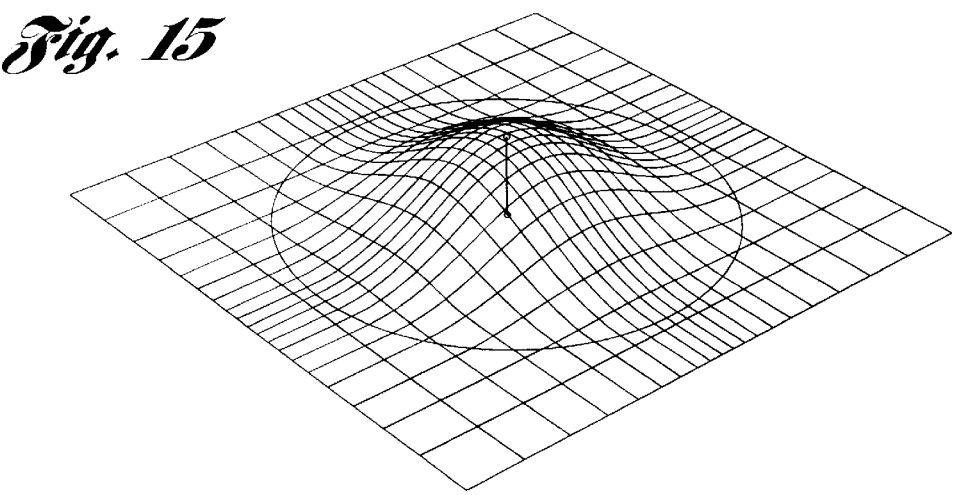
FIG. 15 shows a geometric DSM feature with improved feature boundary shape as compared with its parametric counterpart in FIG. 14.

As previously stated, a second limitation of the prior art is that a feature may not be faithfully formed in object space because there is often a spatial disproportion existing between the parametric space where the basis function is formed and object space where the feature is mapped into. For instance, a uniformly spaced grid in the parametric space may not have uniform spacing, or even be parallel, when mapped to object space. See the illustration in FIG. 14 where a parametric DSM feature is placed on a surface patch which does not have uniform parametric spacing. The feature has a circular boundary in the DSM feature space, and thus circular in the parametric space of the surface patch. However, the final shape of a feature exhibits a significant distortion. FIG. 15 illustrates the reduction in parametric feature distortion resulting from super-mesh reparametrization. In this example, the geometrically perfect but parametrically distorted B-spline plane shown in FIG. 14 was used as a base patch for super-mesh feature creation. Note that, for this particular example, the super-mesh space coincides with the surface patch. A geometric DSM feature is formed using the same basis function and circular boundary curve defined for the parametric DSM feature as in FIG. 14.

Figure 16:
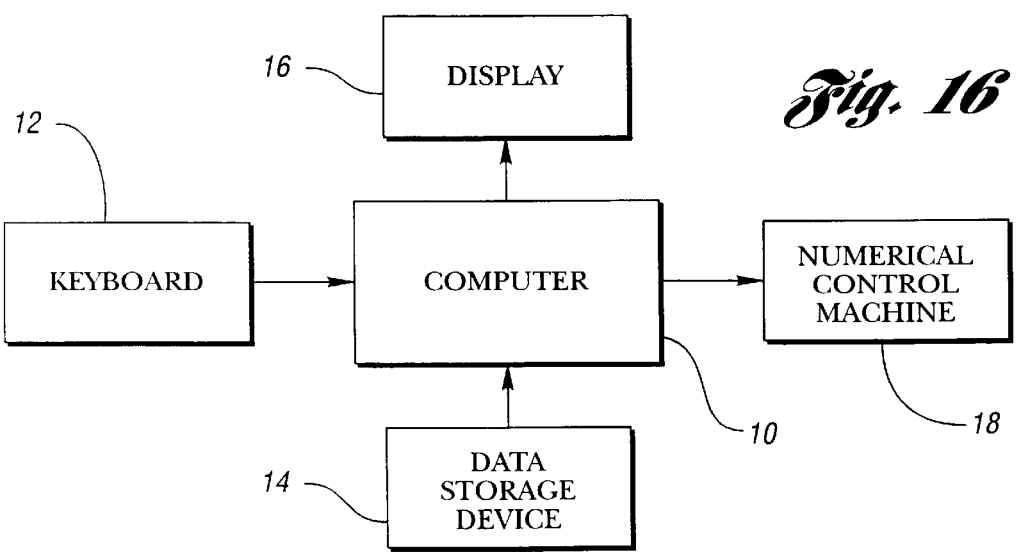
FIG. 16 is a block diagram of a system for manufacturing parts in accordance with the present invention.

With reference to FIG. 16 a system for manufacturing parts using the method of the present invention is shown. The system includes a computer 10, which includes a CPU, memory and communication capability. Input devices include a keyboard 12 and data storage devices 14. The devices 14 may include magnetic or optical disks containing geometric coordinate data from a surface patch and feature description data defining geometric features for input to the computer 10. Other input devices such as a mouse may also be used. The computer 10 generates DSM features for display on a monitor 16 and may generate tool paths on the features for use by a numerical control machine 18 to cut dies or molds based on the tool paths. Parts may then be produced using the dies for stamping or molds for casting or injection molding.

The present invention provides a solution to the two major limitations of the parametric DSM method by introduction of a new, global surface reparametrization mechanism which reparametrizes topologically-disconnected and geometrically-disproportional surface patches into a single, uniform mesh. Features created based on this uniform mesh are, hence, able to overlap multiple surface patches. In addition, spherical projection is employed in conjunction with the super-mesh concept to provide a computational procedure for surface point reparametrization. The use of the spherical projection yields a more uniform parametrization and hence less distortion than other existing methods, such as parallel projection.

Several possible variations of the super-mesh reparametrization method are possible. The first would be the implementation of other projection methods to perform surface reparametrization in super-mesh space. For instance, parallel projection could be substituted for spherical projection for cases involving relatively flat base surface regions for computational efficiency. Other projections, such as normal projection (projection in the direction of surface normals), may achieve better results in some cases. Second, although geometric DSM is a powerful tool for creation of quality surface features, the resulting surface representations are different from the industrial standard, i.e., the NURBS representation. Hence, for data exchange purposes, a geometric feature ultimately needs to be converted into the NURBS format.

While the best mode for carrying out the present invention has been described in detail, those familiar with the art to which this invention relates will recognize various alternative designs and embodiments for practicing the invention as defined by the following claims.

What is claimed is:

1. A computer implemented method of creating a geometric feature on an existing object comprising a sequence of the following steps:

inputting, to a computer, geometric coordinate data from at least a single surface patch;

inputting, to said computer, feature description data defining the geometric feature;

reparametrizing said coordinate data to translate the data into a uniform coherent parameter space;

calculating the geometric offset of the reparametrized data to form the feature geometry according to said geometric feature description data;

adding the calculated offset to the inputted geometric coordinate data from the surface patch to form output data; and using the output data to form at least a portion of a product.

2. The method defined in claim 1 wherein said feature inputting step includes inputting the boundary, basis function, location, magnitude and orientation of the feature.

3. The method defined in claim 1 wherein said feature is created across multiple surface patches.

4. The method defined in claim 3 wherein said patches include at least patches S1 and S2 that are surface patches with independent reference frames.

5. The method defined in claim 1 wherein said patches may be described by parametric surface representations.

6. The method defined in claim 1 wherein said patches may be described by algebraic surface representations.

7. The method defined in claim 1 wherein said patches may be described by discrete data points.

8. A computer implemented method of creating a geometric feature on an existing object comprising a sequence of the following steps:

inputting, to a computer, geometric coordinate data from at least first and second surface patches;

inputting, to said computer, feature description data defining the geometric feature;

defining a super-mesh space for each of said patches;

mapping points from said first and second patches from object space to super-mesh space to thereby reparametrize the patches in the super-mesh space;

creating a basis function in one dimension to represent the characteristic profile of a feature;

translating the one dimensional basis function to a two dimensional basis function in a direct surface manipulation feature space that describes the characteristic shape of the feature;

mapping the two dimensional basis function to super-mesh space;

specifying an offset vector that defines the location of an individual surface point lying within the boundary of the mapped basis function;

offsetting the remainder of the points within the feature boundary parallel to the offset vector and scaled by the value of the basis function evaluated at the corresponding location;

mapping the DSM boundary curve from the super-mesh space back onto the surfaces patches to form output data; and using the output data to form at least a portion of a product.

9. The method defined in claim 8 wherein the feature portion of the output data includes only those points of the feature that lie within the boundary of the surface patches.

10. The method defined in claim 8 wherein the forward mapping step of mapping points from said first and second patches to super-mesh space includes the steps of:

transforming the global (x,y,z) Cartesian coordinates of a point Q into local spherical coordinates $(\rho,\theta,\alpha)$;

transforming the spherical coordinates $(\rho,\theta,\alpha)$ into super-mesh polar coordinates $(r,\theta)$; and converting the super-mesh polar coordinates $(r,\theta)$ into Cartesian coordinates $(u_s,v_s)$.

11. The method defined in claim 10 wherein the forward mapping step of transforming the global (x,y,z) Cartesian coordinates of a point Q into local spherical coordinates $(\rho,\theta,\alpha)$ includes the steps of:

transforming Q(x,y,z) into its local Cartesian coordinates $(x_1,y_1,z_1)$ in accordance with the following equation $$[x_1,y_1,z_1,w]^T = [x,y,z,1][M]_{4\times 4};$$

where $[M]_{4\times 4}$ is the transformation matrix converting Q into spherical coordinates in accordance with the following equations $$\rho = \sqrt{x_1^2 + y_1^2 + z_1^2}$$
$$\theta = \arctan\left(\frac{y_1}{x_1}\right)$$
$$\alpha = \arccos\left(\frac{z_1}{\rho}\right).$$

12. The method defined in claim 8 wherein the backward mapping step of mapping the DSM boundary curve from the super-mesh space back onto the surfaces patches includes the steps of:

converting the Cartesian coordinates $(u_s,v_s)$ of a point C into polar coordinates $(r,\theta)$;

transforming $(r,\theta)$ into spherical coordinates $(\rho,\theta,\alpha)$;

spherically projecting the point C onto the surface patches.

13. The method defined in claim 12 wherein the backward mapping step of converting $(u_s,v_s)$ into polar coordinates $(r,\theta)$ is done in accordance with the following equations:

$$r = \sqrt{u_s^2 + v_s^2}$$
$$\theta = \arctan\left(\frac{v_s}{u_s}\right).$$

14. A computer implemented system of creating a geometric feature on an existing object comprising:

input means for inputting to a computer, geometric coordinate data from at least first and second surface patches and for inputting feature description data defining the geometric feature;

a computer comprising;

means for defining a super-mesh space for each of said patches;

first mapping means for mapping points from said first and second patches from object space to super-mesh space to thereby reparametrize the patches in the super-mesh space;

means for creating a basis function in one dimension to represent the characteristic profile of a feature;

means for translating the one dimensional basis function to a two dimensional basis function in a direct surface manipulation feature space that describes the characteristic shape of the feature;

second mapping means for mapping the two dimensional basis function to super-mesh space;

means for specifying an offset vector that defines the location of an individual surface point lying within the boundary of the mapped basis function;

means for offsetting the remainder of the points within the feature boundary parallel to the offset vector and scaled by the value of the basis function evaluated at the corresponding location; and third mapping means for mapping the DSM boundary curve from the super-mesh space back onto the surfaces patches to form output data; and means for using the output data to form at least a portion of a product.

15. The system defined in claim 14 wherein the feature portion of the output data includes only those points of the feature that lie within the boundary of the surface patches.

16. The system defined in claim 14 wherein the first means for mapping points from said first and second patches to super-mesh space includes:

means for transforming the global (x,y,z) Cartesian coordinates of a point Q into local spherical coordinates $(\rho,\theta,\alpha)$;

means for transforming the spherical coordinates $(\rho,\theta,\alpha)$ into super-mesh polar coordinates $(r,\theta)$; and means for converting the super-mesh polar coordinates $(r,\theta)$ into Cartesian coordinates $(u_s,v_s)$.

17. The method defined in claim 16 wherein the means for transforming the (x,y,z) Cartesian coordinates of a point Q into spherical coordinates $(\rho,\theta,\alpha)$ includes:

means for transforming Q(x,y,z) into its local Cartesian coordinates $(x_1,y_1,z_1)$ in accordance with the following equation $$[x_1,y_1,z_1,w]^T = [x,y,z,1][M]_{4\times 4};$$

where $[M]_{4\times 4}$ is the transformation matrix and means for converting Q into spherical coordinates in accordance with the following equations $$\rho = \sqrt{x_1^2 + y_1^2 + z_1^2}$$

$$\theta = \arctan\left(\frac{y_1}{x_1}\right)$$

$$\alpha = \arccos\left(\frac{z_1}{\rho}\right).$$

18. The system defined in claim 14 wherein the third means for mapping the DSM boundary curve from the super-mesh space back onto the surfaces patches includes:

means for converting the Cartesian coordinates $(u_s,v_s)$ of a point C into polar coordinates $(r,\theta)$;

means for transforming $(r,\theta)$ into spherical coordinates $(\rho,\theta,\alpha)$; and means for spherically projecting the point C onto the surface patches.

19. The method defined in claim 18 wherein the means for converting $(u_s,v_s)$ into polar coordinates $(r,\theta)$ uses the following equations:

$$r = \sqrt{u_s^2 + v_s^2}$$

$$\theta = \arctan\left(\frac{v_s}{u_s}\right).$$

* * * * *